(12) United States Patent
Hicks, III et al.

(10) Patent No.: US 8,171,517 B2
(45) Date of Patent: May 1, 2012

(54) APPARATUS AND METHOD FOR DISTRIBUTING MEDIA CONTENT TO VEHICLES

(75) Inventors: John Alson Hicks, III, Roswell, GA (US); Randy Zimler, Gainesville, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 423 days.

(21) Appl. No.: 12/333,968

(22) Filed: Dec. 12, 2008

(65) Prior Publication Data

US 2010/0154008 A1    Jun. 17, 2010

(51) Int. Cl.
*H04N 7/15*     (2006.01)
*H04N 7/18*     (2006.01)
*H04N 7/173*    (2006.01)
(52) U.S. Cl. .......... 725/62; 72/75; 72/80; 72/81; 72/116
(58) Field of Classification Search .................... 725/62, 725/75, 80, 81, 116
See application file for complete search history.

(56) References Cited

U.S. PATENT DOCUMENTS

| | | | |
|---|---|---|---|
| 7,103,357 B2 * | 9/2006 | Kirani et al. | 455/426.1 |
| 2002/0062385 A1 | 5/2002 | Dowling | |
| 2002/0085719 A1 | 7/2002 | Crosbie | |
| 2002/0143971 A1 | 10/2002 | Govindarajan et al. | |
| 2003/0084165 A1 | 5/2003 | Kjellberg et al. | |
| 2004/0143652 A1 | 7/2004 | Grannan et al. | |
| 2005/0249145 A1 | 11/2005 | Wilson | |
| 2006/0107295 A1 | 5/2006 | Margis et al. | |
| 2007/0288466 A1 * | 12/2007 | Bohannon et al. | 707/10 |
| 2008/0192820 A1 * | 8/2008 | Brooks et al. | 375/240.02 |
| 2008/0249969 A1 | 10/2008 | Tsui et al. | |
| 2010/0077440 A1 * | 3/2010 | Medina et al. | 725/116 |

* cited by examiner

*Primary Examiner* — Kieu Oanh T Bui
(74) *Attorney, Agent, or Firm* — Yudell Isidore Ng Russell PLLC (57) ABSTRACT

A system that incorporates teachings of the present disclosure may include, for example, a server having a controller to wirelessly download media content to a media device of a vehicle from a point in the media content where a gateway previously stopped downloading the media content to the vehicle media device, where the server is in a reconfigurable master-slave relationship with the gateway, where the server and the gateway are remote from each other and remote from the vehicle, and where the gateway is associated with the vehicle. Other embodiments are disclosed.

21 Claims, 5 Drawing Sheets

APPARATUS AND METHOD FOR DISTRIBUTING MEDIA CONTENT TO VEHICLES

FIELD OF THE DISCLOSURE

The present disclosure relates generally to communication systems and more specifically to an apparatus and method for distributing media content to vehicles.

BACKGROUND

Entertainment systems in vehicles are increasing in popularity, and can provide passengers with a more enjoyable travel experience, such as during long periods of driving. These systems allow for presentation of movies that can be loaded onto DVD players of the system, as well as playing of video games from video game consoles that are connectable to a display device of the system. These entertainment systems can have a wide variety of adjustable features for improving the viewing and listening experience of the passengers.

DETAILED DESCRIPTION

One embodiment of the present disclosure can entail machine-readable medium comprising computer instructions to determine a location of a vehicle, reconfigure a master-slave relationship between one or more servers and a gateway based on the location where the one or more servers and the gateway are remote from the vehicle and remote from each other and where the gateway is associated with the vehicle, access stored user preferences associated with a media device of the vehicle, obtain media content, adjust a format of the media content based on the stored user preferences, and download the media content to the vehicle media device from a point in the media content where the gateway previously stopped downloading the media content to the vehicle media device.

Another embodiment of the present disclosure can entail a server having a controller to wirelessly download media content to a media device of a vehicle from a point in the media content where a gateway previously stopped downloading the media content to the vehicle media device, where the server is in a reconfigurable master-slave relationship with the gateway, and where the server and the gateway are remote from each other and remote from the vehicle.

Yet another embodiment of the present disclosure can entail a network element having a controller wirelessly download media content to a media device of a vehicle from a point in the media content where a wireless access point previously stopped downloading the media content to the vehicle media device, where the network element is in a reconfigurable master-slave relationship with the wireless access point, where the wireless access point and the network element are remote from each other and remote from the vehicle, and where the network element is associated with the vehicle.

Yet another embodiment of the present disclosure can entail a vehicle media device having a controller to wirelessly receive media content from one of a server and a gateway from a point in the media content where the other of the server and the gateway previously stopped downloading the media content to the vehicle media device, where the server and the gateway are remote from each other and remote from the vehicle, where the gateway is associated with the vehicle, where the received media content has a format previously adjusted by at least one of the server and the gateway based on stored user information associated with the vehicle media device.

Yet another embodiment of the present disclosure can entail a method including accessing stored user preferences associated with a media device of a vehicle, obtaining media content, adjusting a format of the media content based on the stored user preferences, and from one of a gateway and a server downloading the media content to the vehicle media device from a point in the media content where the other of the gateway and the server previously stopped downloading the media content to the vehicle media device, where the server and the gateway are remote from the vehicle and remote from each other, and where the gateway is associated with the vehicle.

Figure 1:
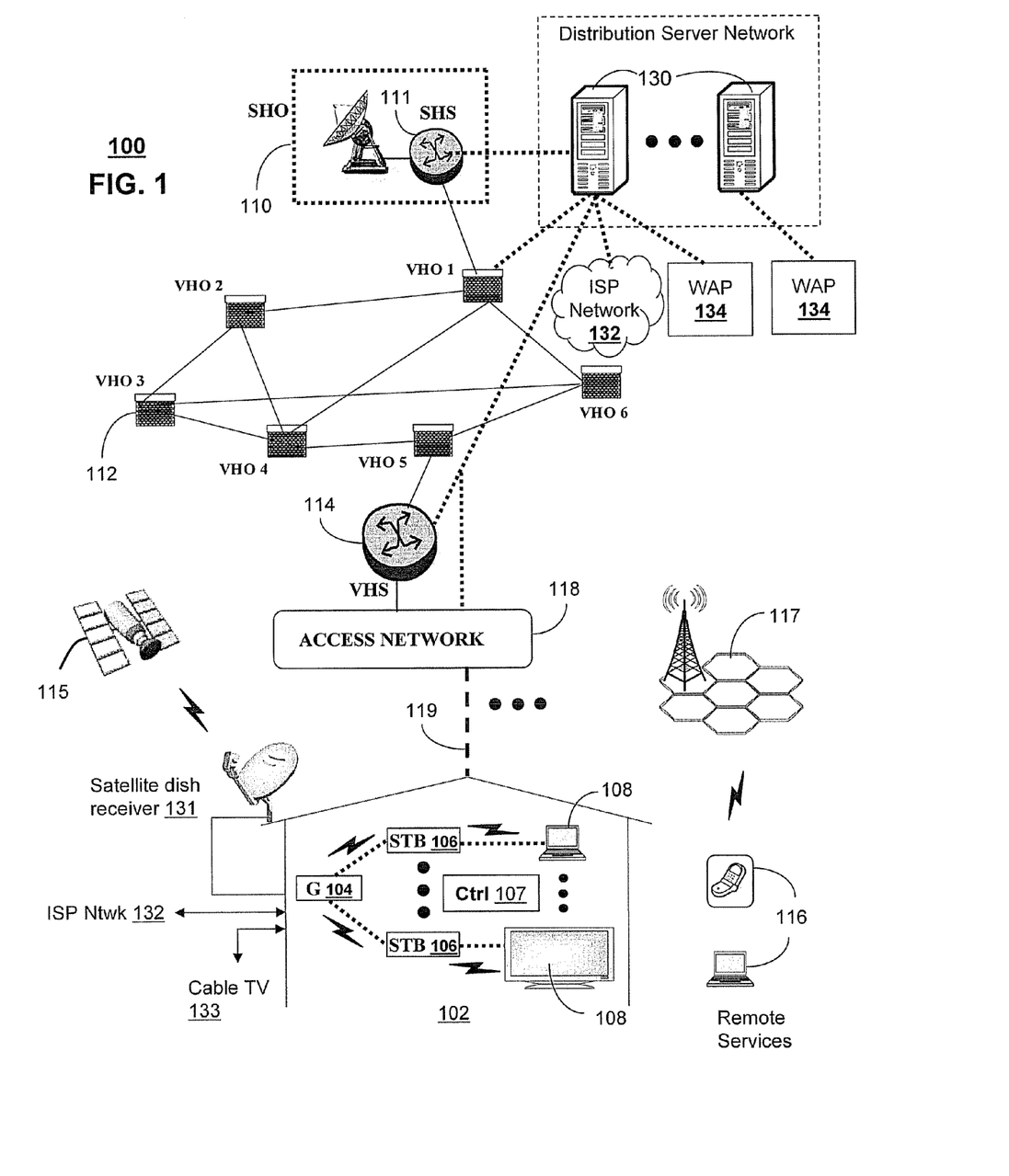
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the computing devices 130 can comprise a network of servers having access to media content and the ability to wirelessly provide that media content to a vehicle having a display device therein, such as a vehicle entertainment center. The servers 130 can be geographically distributed into hotspots. The servers 130 can provide for a reconfigurable master/slave relationship amongst each other, as well as amongst one or more user networks, such as a home network associated with the vehicle. The servers 130 can provide for locating the vehicle and commencing a download of the media content or continuing the download from a desired point, such as the download point of a previous hotspot. In one embodiment, the servers 130 can provide for converting media formats so as to be appropriate for the receiving device of the vehicle. The particular communication protocol and technique can vary and can include WiFi, WiMax, Bluetooth, and so forth. In one embodiment, the servers 130 can be multimode devices that determine and/or utilize a desired or preferred mode of communication for the download.

It follows from the above illustrations that the present disclosure can apply to any present or future interactive media content services.

Figure 2:
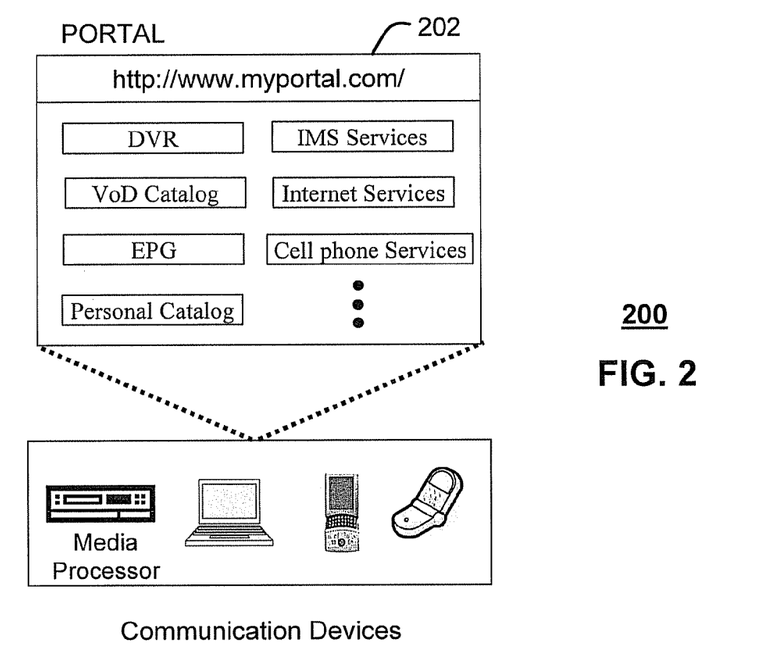
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
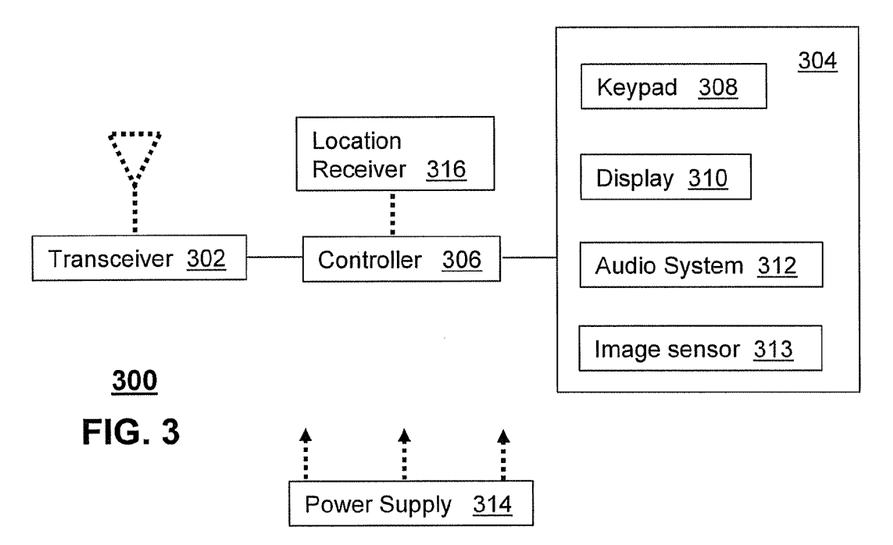
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIG. 1. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alpha-numeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation. The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication system 100 of FIG. 1 such as a gaming console and a media player.

Figure 4:
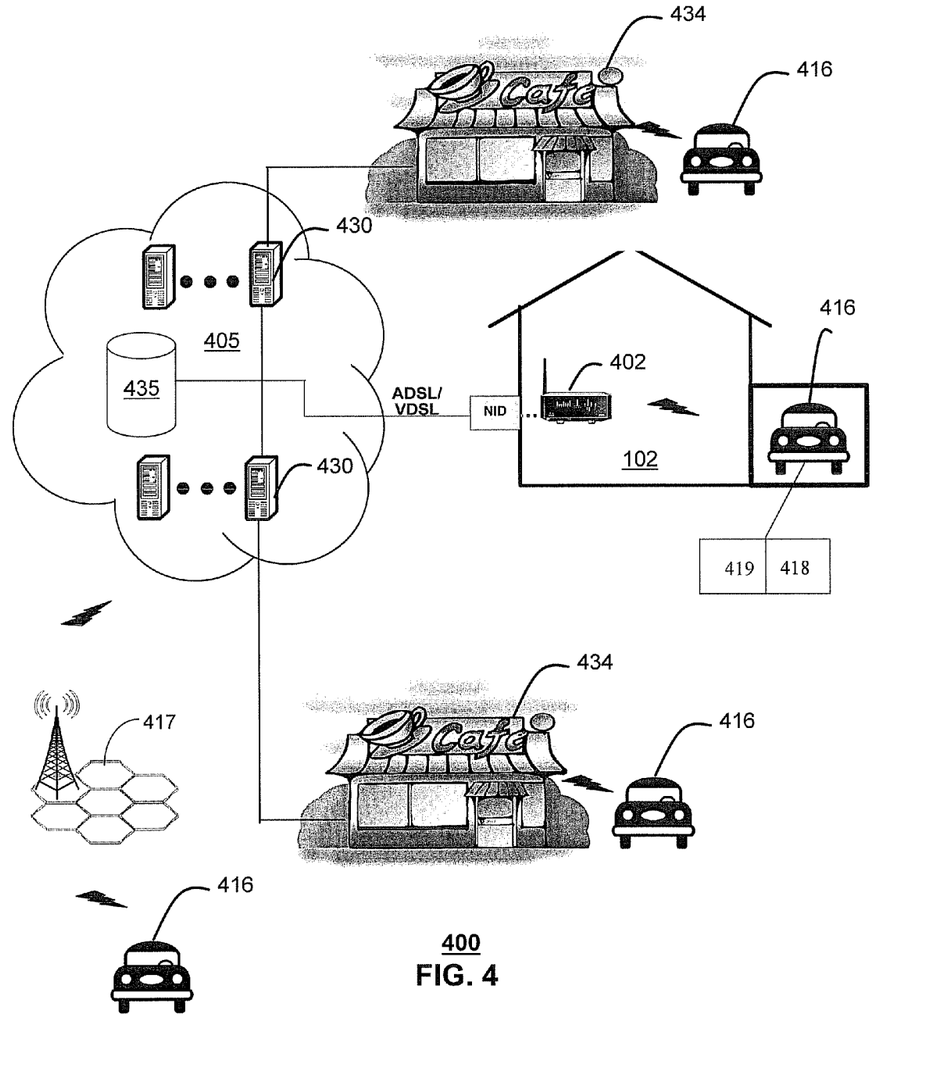
FIG. 4 depicts an illustrative embodiment of a communication system that provides media services.

FIG. 4 depicts an exemplary embodiment of a communication system 400 for delivering media content. Communication system 400 can be overlaid or operably coupled with communication system 100 as another representative embodiment of said communication systems.

System 400 can include a user network, residence or other location 102 having a gateway 402, and a network 405 of servers 430 for selective distribution of media content to the residence and one or more wireless access points (WAP's) or hot spots 434. The gateway 402 and the WAP's 434 can download requested media content to a vehicle 416, which has a gateway 418 and hardrive 419. The gateway 402 and the WAP's 434 can collectively download media content to the vehicle 416 as the vehicle moves to different locations, such as through use of a reconfigurable master/slave arrangement. The vehicle 416 can include various components of an entertainment system for presentation of the media content, including components described with respect to device 300.

System 400 can utilize various protocols, techniques and combinations thereof for transmitting the requested media content to the vehicle 416, including WiFi, WiMax, GPRS, 3G, 4G and so forth. System 400 can also utilize various protocols, techniques and combinations thereof for transmitting the requested media content to various points throughout the system, including use of an IPTV access network, the public Internet, and/or an IMS network. In one embodiment, the servers 430 can be positioned at the WAP's 434 and/or the WAP's can utilize transceivers operable coupled to remotely-located servers. In another embodiment, various components of the residence 102 are Digital Living Network Alliance (DLNA) compatible, such as the gateway 402.

System 400 can include, or be operably coupled with, a wireless access system, such as a cellular communication system having a wireless access base station 417 operating according to cellular communication technologies (such as GSM, CDMA, UMTS, WiMAX, Software Defined Radio or SDR, and so on). The vehicle 416, such as its gateway 418, can communicate through use of the base station 417 for requesting media content. System 400 allows the vehicle to request desired media content, which is then downloaded when the vehicle is within proximity to the residence 102 and/or the one or more WAP's 434. In one embodiment, the system 400 can utilize the base station 417 for communicating selections of media content to be later downloaded. Search functions, such as based on previous searches or monitored behavior (including previous downloads to the vehicle or previous content viewed by the user such as at a set top box of the residence 102), can be provided to the vehicle 416.

The exemplary embodiment of FIG. 4 describes the vehicle 416 utilizing a long distance communication technology for ordering and/or searching for media content, such as a multi-mode gateway 418 incorporated into the vehicle, but the present disclosure contemplates the use of other mobile devices, such as a passenger's cell phone, for ordering and searching the media content by communicating with the network 405 and/or a proxy of the network. Other information can be communicated between the vehicle 416 and the network 405 using the base station 417 in preparation of the download, including user preferences as to format, registration and authentication data, and so forth.

In one embodiment, location data can be communicated to the network 405 in anticipation of arrival at the residence 102 or the WAP's 434. In this example, the network 405 can prepare for the download based on the anticipated arrival of the vehicle 416, including performing the master/slave reconfiguration, retrieving the media content such as from a storage device or database 435 (including remaining portions of the content to be downloaded), verifying DRM compliance, and so forth.

The present disclosure contemplates retrieval of the media content from various sources. For instance, the media content can be received and stored on the gateway 402. The network 405 can then retrieve the media content or portions thereof, provide the media content to the server 430; and download the media content to the vehicle 416 through use of the WAP 434. The particular device that commences the download to the vehicle 416 can vary and can be one of the servers 430 or the gateway 402. In another embodiment, the servers 430 can retrieve the media content from a source other than the gateway 402 of the residence 102. For instance, the gateway 402 can retrieve the media content from a network storage device and the servers 430 can then retrieve the media content directly from the same storage device in anticipation of downloading to the vehicle 416.

A number of network devices, including DSLAM's, service routers and Ethernet switches, can be utilized for transporting the signals along and from the network 405, and can be provided in various areas of the provider network including intermediate offices, central offices and neighborhood offices. The network 405 can utilize a number of connection structures for providing a communication link with the communication devices, including twisted pair lines, fiber lines and/or wireless connections. In one embodiment, an IMS network can be coupled to or incorporated with a Universal Mobile Telecommunications System (UMTS) network, which can utilize various components, techniques and protocols for establishing wireless communication with mobile devices (including the vehicle 416), such as W-CDMA.

The server 430 can have access to database 435, which can be used for establishing and maintaining user profiles or other user information, including user storage. The user profiles can be associated with one or more users of the network 405, as well as their communication devices. The user profiles can include device identification data, device and/or user preferences, format capabilities, service plans, presence information, and so forth. In one embodiment, the user storage can include media content that has been recorded. In another embodiment, the user profiles can include monitored behavior and history of the user and/or user pre-selections, such as preferences inputted by the user in temporal proximity to a request for downloading media content to the entertainment system of vehicle 416.

In another embodiment, the user information or profiles can be imported in whole or in part from other sources, such as from a third party network, including previous service providers. In one embodiment, the user information or profiles can be a group storage for multiple users, such as users associated with a residence or a business entity, which has a plurality of individual user profiles associated with each of the users. While system 400 depicts the network 405 storing the user information or profiles in a centralized fashion, it should be understood by one of ordinary skill in the art that the present disclosure contemplates other configurations, including distributed configurations, being applied to system 400.

In one embodiment, the network 405 can provide for signal processing to be applied to the video content, such as according to an Advanced Television Systems Committee standard (ATSC) including the mobile handheld standard, so that code is embedded in the multiplex which develops lower profile versions of the main profile. In another embodiment, the standard can be based on or related to the ATSC Recommended Practice: E-VSB Implementation Guidelines, document ATSC A/112, which is the ATSC standards related to E-VSB (Enhanced Vestigial Sideband modulation), and which provides guidelines to parameter selection and implementation scenarios; the disclosure of which is incorporated herein by reference. The E-VSB data can be received by the server(s) 430 and/or generated by the server(s).

For example, the media content video data can be reformatted using E-VSB or other multi-profiling formats with main and lower profile versions. The lower profile versions of the video stream can have a lower resolution but higher error correction data (such as Forward Error Correction data) in order to maintain a link with devices receiving a weak signal. In one embodiment, select one(s) of the profile versions can be provided to the vehicle 416 by the server(s) 430 when there is a fault or potential fault determined during the download. The fault monitoring can be performed by the server(s) 430 or some other monitoring device, and/or can be performed by the receiving device of the vehicle 416. The particular error correction technique utilized for the various profiles can vary and can include FEC, such as block coding, convolution coding, concatenate coding, turbo coding and so forth.

The exemplary embodiments can be performed by a single service provider or vendor, as well as through use of different service providers or vendors, including home and mobile services being different vendors where the service provider associated with the server(s) 430 provides an agreed service coordination of benefit to the user.

Figure 5:
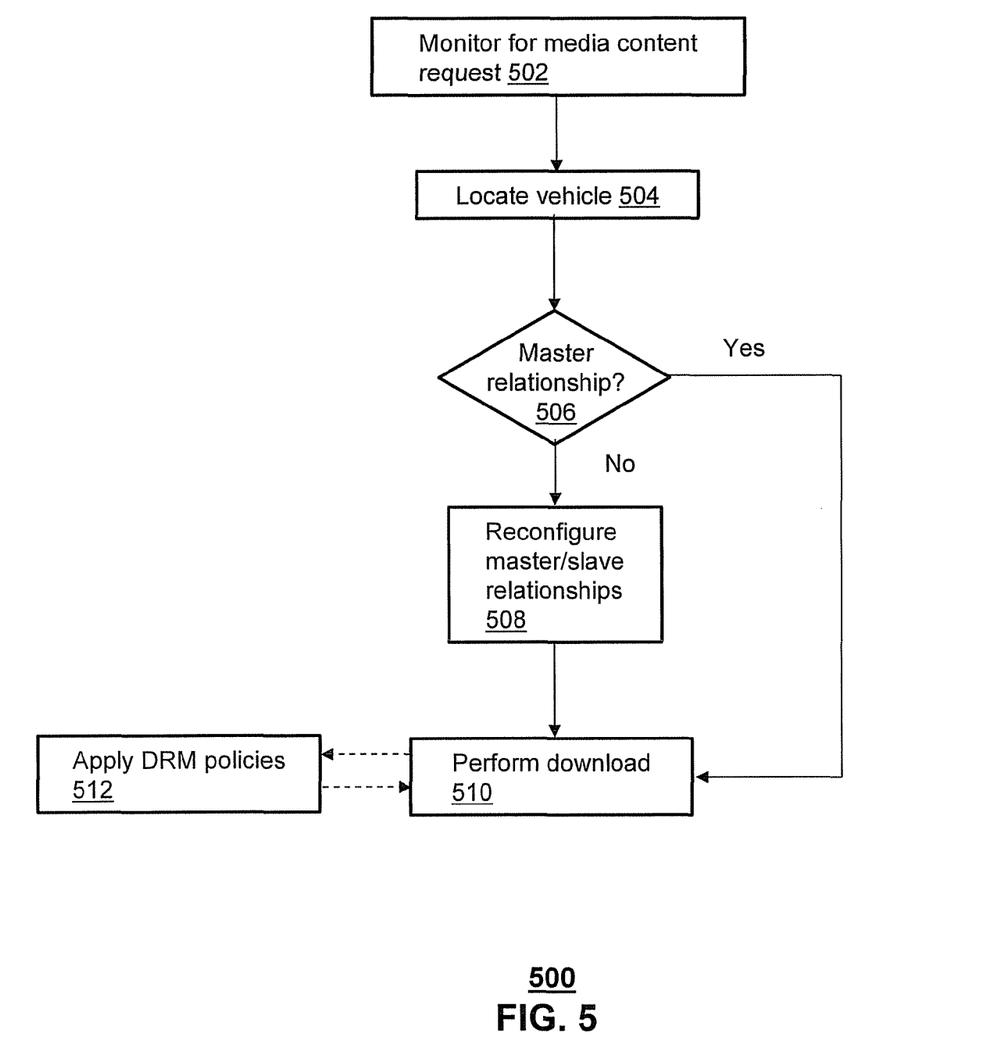
FIG. 5 depicts an illustrative embodiment of a method operating in portions of the communication systems of FIGS. 1 and 4.

FIG. 5 depicts an illustrative method 500 operating in portions of communication systems 100 and 400, including using gateway 402 and servers 430 of system 400. Method 500 can begin with step 502 in which network 405 receives a request for media content. The request can be transmitted to a proxy, such as a centralized server or one or more distributed servers, associated with the network 405. The request can be received from various sources, including the gateway 402, the vehicle 416 (such as from gateway 417), and/or from a mobile device (such as of a passenger of the vehicle).

In step 504, a location of the vehicle 416 can be determined. The location determination can be based on a number of techniques, including GPS data, cellular triangulation and so forth. In one embodiment, the vehicle location data can be obtained from a navigation system of the vehicle 416 and transmitted to the gateway 418 which then transmits the location information to the network 405, including to one or more of the servers 430 and/or a proxy of the network. In another embodiment, the location can be determined by location signals transmitted by the vehicle gateway 402, which are detected by a WAP 434.

In step 506, the network 405 can determine if the server 430 or the residence gateway 402 corresponding to the location of the vehicle 416 is in a master role of a master/slave relationship. If the particular device (the server 430 or gateway 404) is in a slave relationship then the network can reconfigure the master/slave relationship as in step 508 so that the device assumes a master role and then can proceed to step 510 for downloading of the media content. If the particular device is already in a master role then the method 500 can proceed directly to step 510 for downloading of the media content.

The reconfiguration of the master/slave relationship allows for smart downloading by having a first device commence the download and a second or more devices continue and finish the download. Bookmarking or other downloading progress history can be efficiently transmitted between the downloading devices including the server(s) 430 and residential gateway 402. Registering, authentication, media content retrieval, and other steps utilized in downloading a single media content from various sources as a vehicle moves to different locations can be more efficiently processed by changing the master/slave arrangement of the servers 430 and the residential gateway 402.

The media content being downloaded in system 400 can vary and can include data files, e-mails, video games, and so forth. In one embodiment, a network backup storage device can also store the media content that has been delivered to the residential gateway 402. The server(s) 430 can access the gateway 402 and/or the backup device for access to the media content to be downloaded.

In one embodiment in step 512, DRM policies can be applied to the download of the media content. For instance, downloading can be limited to particular vehicles of a user. As another example, if a particular region does not permit download of certain media content (such as based on an adult rating) then the server 430 can deny or otherwise qualify (such as based on the user being an adult) the downloading.

In one embodiment, the user profiles can include monitored behavior data associated with the user and one or more of the user's communication devices, including the vehicle gateway 418. The behavior data can be utilized in determining format adjustments for the media content to be delivered to the vehicle 419. In another embodiment, the server 430 can consult user preferences of the user profiles to determine if the video/audio data is in a desired format or is otherwise comprised of desired parameters associated with the entertainment system of the vehicle 416. For instance, the video data can be adjusted as to resolution by the server 430 prior to receipt by the vehicle gateway 418. In one embodiment, parties that are not associated with a particular service provider but that participate in the download through use of a mobile device can have sub-profiles established within the user profile so that future downloads with such parties can be enhanced, such as through video/audio data format adjustments. For instance, if a mobile hand-held TV device is being utilized for downloading a portion of the media content from the WAP 434 then a sub-profile for that party and his or her device can be established so that any future downloads can be facilitated (including storing desired formats for the device).

In one embodiment, the format adjustment can be based on the use of multiple profile versions of the video content, such as through use of E-VSB. For example, the server 430 can receive the video stream and adjust the video stream into main and secondary profiles. In another embodiment, the server 430 can receive the video stream containing main and secondary profiles, remove select profile versions, and transmit those select profile versions for the media download. The amount of error correction and thus the resolution of the profile versions can be determined based on a number of factors, including user preferences in the user profiles and monitored network conditions, such as traffic or latency.

Upon reviewing the aforementioned embodiments, it would be evident to an artisan with ordinary skill in the art that said embodiments can be modified, reduced, or enhanced without departing from the scope and spirit of the claims described below. For example, the server 430 can allow for download participation by other communication devices associated with the vehicle 416. For instance a first portion of the media content can be downloaded to the gateway 418 from the WAP 434 while a second portion of the media content is being downloaded to a mobile device (such as a hand-held TV device) of a passenger of the vehicle. The mobile device can then transmit the second portion of the media content to the vehicle gateway 419 for storage on the vehicle hardrive.

In one embodiment, the server 430 can determine a preferred mode of communication for downloading the media content. For instance, the vehicle gateway 418 can be limited as to its modes of communication and the server 430 can make this determination. Other factors for determining a preferred mode of communication for the download can also be utilized, including strength of signal and so forth. In another embodiment, media content stored on the vehicle gateway 418 can be downloaded to the residential gateway 402.

Other suitable modifications can be applied to the present disclosure without departing from the scope of the claims below. Accordingly, the reader is directed to the claims section for a fuller understanding of the breadth and scope of the present disclosure.

Figure 6:
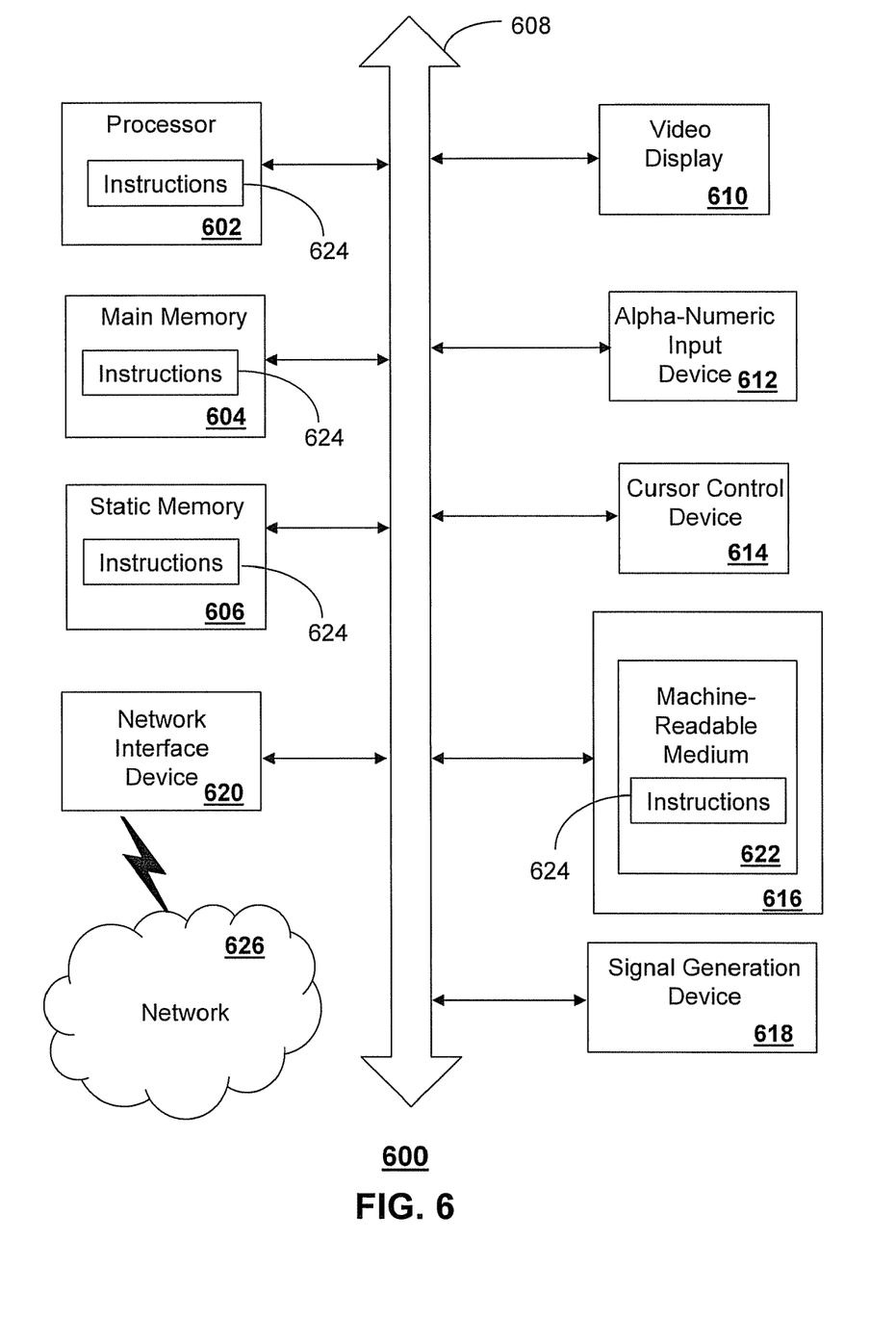
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable medium comprising computer instructions to:
   determine a location of a vehicle;
   reconfigure a master-slave relationship between one or more servers and a gateway based on the location, the one or more servers and the gateway being remote from the vehicle and remote from each other, the gateway being associated with the vehicle;
   access stored user preferences associated with a media device of the vehicle;
   obtain media content;
   adjust a format of the media content based on the stored user preferences; and
   download the media content to the vehicle media device from a point in the media content where the gateway previously stopped downloading the media content to the vehicle media device.

2. The storage medium of claim 1, wherein the gateway is a residential gateway and comprising computer instructions to retrieve the media content from the residential gateway.

3. The storage medium of claim 1, comprising computer instructions to download the media content to the vehicle media device using a first wireless communication protocol that is different from a second wireless communication protocol previously utilized for requesting the download of the media content to the vehicle media device.

4. The storage medium of claim 3, wherein the second wireless communication protocol is cellular communication.

5. The storage medium of claim 1, comprising computer instructions to download a first portion of the media content to the vehicle media device and download a second portion of the media content to a mobile communication device in geographic proximity to the vehicle, the first and second portions of the media content being downloaded in temporal proximity.

6. The storage medium of claim 5, comprising computer instructions to download the first portion of the media content using a first wireless communication protocol that is different from a second wireless communication protocol utilized to download the second portion of the media content.

7. The storage medium of claim 1, comprising computer instructions to apply a digital rights management policy to the download of the media content.

8. The storage medium of claim 1, comprising computer instructions to adjust the format of the media content into a plurality of versions of video content, wherein a first version has more error correction data than a second version.

9. A server comprising a controller to:
   wirelessly download media content to a media device of a vehicle from a point in the media content where a gateway previously stopped downloading the media content to the vehicle media device, wherein the server is in a reconfigurable master-slave relationship with the gateway, the server and the gateway being remote from each other and remote from the vehicle, wherein the controller is configured to determine a location of the vehicle and reconfigure the master-slave relationship based on the location.

10. The server of claim 9, wherein the controller is configured to adjust a format of the media content into a plurality of versions of video content, wherein a first version has more error correction data than a second version.

11. The server of claim 9, wherein the controller is configured to: access stored user preferences associated with the vehicle media device; obtain the media content; and adjust a format of the media content based on the stored user preferences.

12. The server of claim 11, wherein the media content is retrieved from the gateway.

13. The server of claim 9, wherein the controller is configured to download a first portion of the media content to the vehicle media device and download a second portion of the media content to a mobile communication device in geographic proximity to the vehicle, the first and second portions of the media content being downloaded in temporal proximity.

14. The server of claim 9, wherein the controller is configured to download the media content to the vehicle media device using a first wireless communication protocol that is different from a second wireless communication protocol previously utilized for requesting the download of the media content to the vehicle media device.

15. A network element comprising a controller configured to:
   wirelessly download media content to a media device of a vehicle from a point in the media content where a wireless access point previously stopped downloading the media content to the vehicle media device, wherein the network element is in a reconfigurable master-slave relationship with the wireless access point, the wireless access point and the network element being remote from each other and remote from the vehicle, the network element being associated with the vehicle, and wherein the controller is configured to adjust a format of the media content based on a desired format of the vehicle media device and store the adjusted media content.

16. The network element of claim 15, wherein the controller is configured to receive a request for downloading of the media content from at least one of the vehicle media device and another communication device, and wherein the request is received over a first communication protocol that is different from a second communication protocol utilized for performing the wireless download of the media content to the vehicle media device.

17. A media device of a vehicle, the media device having a controller to: wirelessly receive media content from one of a server and a gateway from a point in the media content where the other of the server and the gateway previously stopped downloading the media content to the vehicle media device, the server and the gateway being remote from each other and remote from the vehicle, the gateway being associated with the vehicle, the received media content having a format previously adjusted by at least one of the server and the gateway based on stored user information associated with the vehicle media device, and wherein the gateway and the server are in a reconfigurable master-slave relationship with each other.

18. A method, comprising:
accessing stored user preferences associated with a media device of a vehicle;
obtaining media content;
adjusting a format of the media content based on the stored user preferences;
from one of a gateway and a server downloading the media content to the vehicle media device from a point in the media content where the other of the gateway and the server previously stopped downloading the media content to the vehicle media device, the server and the gateway being remote from the vehicle and remote from each other, the gateway being associated with the vehicle
determining a location of the vehicle; and
reconfiguring a master-slave relationship between the server and the gateway based on the location.

19. The method of claim 18, wherein the downloading of the media content to the vehicle media device is performed using a first wireless communication protocol that is different from a second wireless communication protocol previously utilized for requesting the downloading of the media content to the vehicle media device.

20. The method of claim 18, comprising downloading a first portion of the media content to the vehicle media device and downloading a second portion of the media content to a mobile communication device in geographic proximity to the vehicle, the first and second portions of the media content being downloaded in temporal proximity.

21. The method of claim 20, comprising downloading the first portion of the media content using a first wireless communication protocol that is different from a second wireless communication protocol utilized to download the second portion of the media content.

* * * * *